US008650448B2

(12) United States Patent
Li et al.

(10) Patent No.: US 8,650,448 B2
(45) Date of Patent: Feb. 11, 2014

(54) RETRANSMISSION TECHNIQUES IN WIRELESS NETWORKS

(75) Inventors: Qinghua Li, San Ramon, CA (US); Ozgur Oyman, San Jose, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 525 days.

(21) Appl. No.: 12/587,842

(22) Filed: Oct. 13, 2009

(65) Prior Publication Data

US 2011/0087944 A1     Apr. 14, 2011

(51) Int. Cl.
*G08C 25/02*     (2006.01)

(52) U.S. Cl.
USPC ........... 714/748; 714/758; 714/751; 714/746; 375/377; 375/340; 370/329; 370/445

(58) Field of Classification Search
USPC ............ 714/758, 751; 375/377, 340; 370/329
See application file for complete search history.

(56) References Cited

U.S. PATENT DOCUMENTS

| 4,663,757 | A | * | 5/1987 | Huang et al. | 370/447 |
|---|---|---|---|---|---|
| 5,179,341 | A | * | 1/1993 | Whiteside | 324/523 |
| 5,436,903 | A | * | 7/1995 | Yang et al. | 370/448 |
| 7,146,133 | B2 | | 12/2006 | Bahl et al. | |
| 2002/0041584 | A1 | * | 4/2002 | Sashihara | 370/337 |
| 2002/0137485 | A1 | * | 9/2002 | Nilsson et al. | 455/184.1 |
| 2002/0147953 | A1 | * | 10/2002 | Catreux et al. | 714/746 |
| 2004/0196801 | A1 | | 10/2004 | Hiramatsu | |
| 2005/0099975 | A1 | * | 5/2005 | Catreux et al. | 370/329 |
| 2005/0172209 | A1 | * | 8/2005 | Cameron et al. | 714/794 |
| 2006/0182168 | A1 | * | 8/2006 | Wang et al. | 375/143 |
| 2006/0187895 | A1 | * | 8/2006 | Nandagopalan | 370/345 |

(Continued)

FOREIGN PATENT DOCUMENTS

| CN | 1537371 A | 10/2004 |
|---|---|---|
| CN | 1630294 A | 6/2005 |

(Continued)

OTHER PUBLICATIONS

Rayanchu, "Diagnosing Wireless Packet Losses in 802.11: Separating Collision from Weak Signal", Jan. 2008, University of Wisconsin, pp. 1-9.*

(Continued)

*Primary Examiner* — Joshua P Lottich
*Assistant Examiner* — Jeison C Arcos
(74) *Attorney, Agent, or Firm* — Sutherland, Asbill & Brennan LLP (57) ABSTRACT

Retransmission techniques are disclosed. These techniques may be used in networks employing contention-based access schemes, such as CSMA. For instance, a device may receive a corrupted packet from a transmitting device, and determine a cause of the corruption. When the determined cause of the corruption is an in-network packet collision, the device allows the transmitting device to send a retransmission of the packet in accordance with a contention-based access scheme. However, when the determined cause of the corruption is other than an in-network packet collision, the device provides retransmission assistance to the transmitting device. This retransmission assistance may include a channel reservation for a retransmission, and/or one or more link adaptation suggestions for the transmitting device.

23 Claims, 6 Drawing Sheets

(56) References Cited

U.S. PATENT DOCUMENTS

| | | | |
|---|---|---|---|
| 2007/0019685 A1* | 1/2007 | Annadurai et al. | 370/516 |
| 2007/0025388 A1* | 2/2007 | Abhishek et al. | 370/447 |
| 2007/0217550 A1* | 9/2007 | Wu et al. | 375/340 |
| 2007/0238480 A1* | 10/2007 | Lin et al. | 455/522 |
| 2009/0262850 A1* | 10/2009 | Catreux et al. | 375/260 |
| 2010/0290438 A1 | 11/2010 | Seok et al. | |

FOREIGN PATENT DOCUMENTS

| | | | | |
|---|---|---|---|---|
| EP | 1515471 | * | 3/2003 | H04L 1/00 |
| JP | 2006-246027 A | | 9/2006 | |
| JP | 2008-054303 A | | 3/2008 | |
| JP | 2008-187725 A | | 8/2008 | |
| KR | 10-2004-0111157 A | | 12/2004 | |
| KR | 10-2009-0074989 A | | 7/2009 | |
| WO | 2009-084913 A | | 7/2009 | |
| WO | 2011/046697 A2 | | 4/2011 | |

OTHER PUBLICATIONS

Biaz, "Distinguishing Congestion Losses from Wireless Transmission Losses: A Negative Result", 1998, IEEE. pp. 1-7.*
International Search Report and Written Opinion received for PCT Patent Application No. PCT/US2010/048779, mailed on May 25, 2011, 8 pages.
International Preliminary Report on Patentability and Written Opinion received for PCT Patent Application No. PCT/US2010/048779, mailed on Apr. 26, 2012, 5 pages.
Office Action Received for Chinese Patent Application No. 201010543998.1, Mailed on Mar. 12, 2013, 9 pages of Office Action including 5 pages of English translation.
Office Action received for Japanese Patent Application No. 2012-534198, mailed on Jun. 11, 2013, 4 pages of office action including 2 pages of English translation.
Office Action received for Russian Patent Application No. 2012119510, mailed on Jul. 5, 2013, 7 pages of office action including 3 pages of English translation.

* cited by examiner

RETRANSMISSION TECHNIQUES IN WIRELESS NETWORKS

BACKGROUND

Wireless networks are becoming increasingly common. Many wireless networks, such as IEEE 802.11 wireless local area networks (WLANs), employ contention-based media access techniques to provide transmitting devices with access to a wireless communications medium (e.g., a channel). For instance, IEEE 802.11 WLANs employ carrier sense multiple access (CSMA) techniques.

CSMA techniques involve a transmitting device verifying the absence of other traffic before sending a transmission on a shared communications medium. This verifying involves the transmitting device "listening" for any network traffic. Once the transmission is sent, the transmitting device will typically await an acknowledgment of successful receipt (an "ACK") by the intended receiving device.

However, IEEE 802.11 standards do not provide for receiving devices to send negative acknowledgements (NACKs) in response to corrupted transmissions that were sent using CSMA techniques. Instead, if the transmitting device does not receive an ACK within a predetermined time, it may pursue sending a retransmission after a waiting period (a "back-off" interval). Although proprietary NACKs exist, they do not provide assistance in overcoming particular forms of interference.

Contention-based techniques work well when packet errors are primarily due to collisions between transmissions from network stations. However, these techniques are not as effective in dealing with co-channel interference, such as bursty out-of-band emissions, platform noise, and/or hidden node collisions.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide collaborative retransmission techniques. These techniques may be used in networks employing contention-based access schemes, such as CSMA. For instance, a device may receive a corrupted packet from a transmitting device, and determine a cause of the corruption. When the determined cause of the corruption is an in-network packet collision, the device allows the transmitting device to send a retransmission of the packet in accordance with a contention-based access scheme. However, when the determined cause of the corruption is other than an in-network packet collision, the device provides retransmission assistance to the transmitting device. This retransmission assistance may include a channel reservation for a retransmission, and/or one or more link adaptation suggestions for the transmitting device.

Thus, instead of remaining silent, the receiving device gathers useful information and helps the transmitting device's retransmission according to the detected failure reason. More particularly, the receiving device provides the transmitting device a retransmission opportunity that is suitable for the cause of the reception failure. As a result, contention times and collision rates of retransmissions may be advantageously reduced.

Such techniques may improve performance in networks employing conventional contention-based media access techniques. As discussed above, conventional WLAN standards (e.g., IEEE 802.11n systems that are not operating in TXOP mode), do not provide for a NACK to be sent when a packet is received in error. Thus, the transmitting device "times out" and waits for a random number of slots (i.e., a back-off) before initiating a retransmission. The purpose of this technique is to avoid colliding with another device's CSMA transmission.

However, many packet errors may be caused by other sources, such as co-channel interference (e.g., bursty out-of-band emissions, platform noise, and/or hidden node collisions). In these cases, employing a back-off may be wasteful of network capacity. To reduce such waste, embodiments may determine a reason for a packet failure at a receiving device. Based on this determination, the receiving device may assist the transmitting device with a retransmission by providing it with additional information.

For example, this determination may involve the receiving device checking whether the soft bits of a corrupted packet are corrupted in a bursty pattern, or whether another preamble and/or channel training symbol was present during the reception of the corrupted packet. Based on such determinations, the receiving device may reserve the medium for a retransmission of the packet.

Also, the receiving device may suggest link parameter and/or contention parameter adaptations for the transmitting device. Examples of such adaptations include (but are not limited to) packet fragmentation settings, rate adjustments, spatial stream adjustments, and/or contention window adjustments. In networks (such as WLANs) that are interference limited (e.g., due to dense deployment and multi-radio coexistence), such collaboration between transmitting and receiving devices may advantageously increase throughput.

Based on the foregoing capabilities, embodiments provide response packets having multiple features. For example, a response packet may include a retransmission request (similar to a NACK), a channel reservation, and a link adaptation suggestion. Such a response packet may be implemented in various ways. For example, embodiments may employ (as a response packet) a clear to send (CTS) packet that is compatible with existing IEEE 802.11 wireless systems. Such a CTS packet may include a retransmission request and a channel reservation. Embodiments, however, are not limited to these exemplary response packets.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
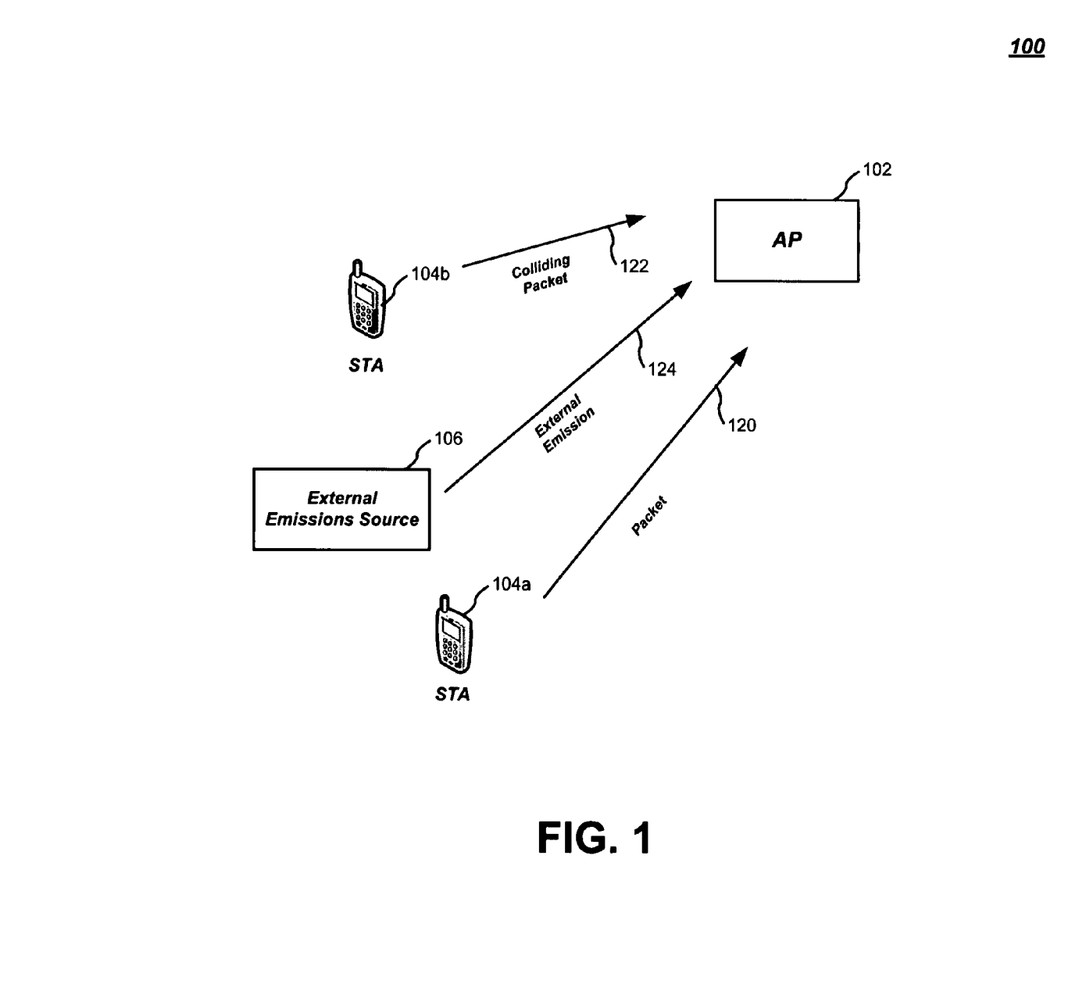
FIG. 1 is a diagram of an exemplary operational environment.

FIG. 1 is a diagram of an exemplary operational environment 100 in which the techniques described herein may be employed. This environment includes multiple devices. In particular, FIG. 1 shows an access point (AP) 102, stations (STAs) 104a-b, and an external emission source 106. These devices may be implemented in any combination of hardware and/or software.

AP 102 and STAs 104a-b may communicate with each other in accordance with a contention-based access scheme, such as CSMA, CSMA with collision avoidance (CSMA/CA), and so forth. Accordingly, these devices may operate as an IEEE 802.11 WLAN (e.g., an IEEE 802.11n WLAN). Embodiments, however, are not limited to IEEE 802.11 WLAN implementations. Moreover, embodiments are not limited to CSMA access schemes. Additionally, such communications may involve STAs 104a-b sending retransmissions in accordance with the techniques described herein. For instance, such retransmissions may be based on response packets sent by AP 102.

For purposes of illustration, FIG. 1 shows STA 104a transmitting a packet 120 to AP 102. Reception of packet 120 at AP 102 may be corrupted by one or more other transmissions. For example, FIG. 1 shows STA 104b transmitting a colliding packet 122, and external emissions source 106 generating an interfering transmission 124.

As described above, noise and interference can cause packet errors. Interference may come from out-of-network sources. Examples of out-of-network sources include other radios, such as Bluetooth, 3G, adjacent channel WiFi, WiMAX and microwave ovens.

With reference to FIG. 1, interfering transmission 124 (which is generated by external emissions source 106) is an example of interference from an out-of-network source. External emissions source 106 may be within a device that is separate and distinct from STAs 104a-b. Alternatively, external emissions source 106 may be within (co-located with) STA 104a. In such cases, a lack of multi-radio coordination may promote co-channel interference caused by out-of-band emissions from the co-located emissions source.

Such co-channel interference may randomly jam desired radio transmissions. As an example, Bluetooth transmissions may interfere with WLAN transmissions for 200-300 microseconds at a time before hopping to another frequency (causing reduced or increased interference—depending on the frequency separation).

Alternatively, interference may come from colliding traffic within the network. An example of such traffic is colliding packet 122, which is transmitted by STA 104b. As a result of such collisions, retransmission may be common and even necessary in deployments, such as WLANs.

Accordingly, with conventional WLAN MAC protocols, a receiving device (e.g., AP 102) sends an acknowledgement (ACK) (after a SIFS time) for a packet that is correctly received. Thus, a transmitting device (e.g., STA 104a) sends a transmission and waits for an ACK from the receiving device. If the transmitting device does not receive the ACK within a predefined time period (after a SIFS time), the transmitting device assumes a packet collision and contends for the channel to send a retransmission.

This channel contention typically involves the transmitting device (e.g., STA 104a) doubling the size of a contention window, waiting for a random number of slots within this window, and then sending a retransmission. This behavior is designed to be effective with packet collisions. However, three observations may be made regarding such conventional WLAN MAC protocols. First, the random waiting time increases latency and reduces throughput. Second, the receiving device does not provide assistance to the transmitting device for the retransmission. Third, such contention protocols do not distinguish between a packet loss due to packet collision and a packet loss due to other interference types.

These observations reveal that existing retransmission procedures (e.g., back-off and doubled window size) may not be beneficial in overcoming packet corruption (also referred to herein as packet loss) due to these other interference types. Thus, embodiments distinguish between causes of packet loss. By making such distinctions, embodiments advantageously provide retransmission and interference-aware link adaptation techniques that may yield significant performance enhancements.

Such techniques may involve a receiving device (such as AP 102) determining useful information from a corrupted packet. From this information, the receiving device may assist the transmitting device in making subsequent transmissions (especially the retransmission).

In wireless networks (e.g., WLANs), data packets are vulnerable to bursty interference that can cause short error sequences in decoded packets. Such short error sequences are more apparent for the systems employing convolutional error correction codes (instead of block codes). Data packets include MAC control information, such as the addresses of the transmitting and receiving devices. This information (which is commonly located in a MAC header at the beginning of the packet) typically occupies only a small portion of the entire packet. Thus, when burst errors occur in a packet, it is likely that the relatively small MAC header will be received intact (uncorrupted).

A receiving device may confirm whether a MAC header in a corrupted packet was successfully decoded by checking the soft bit magnitudes (i.e., log-likelihood ratios of the demodulated bits) corresponding to the MAC header. More particularly, as the soft bit magnitudes increase, so does the reliability of properly receiving the MAC header. For instance, if the first 200-300 soft bits of a WLAN packet have large magnitudes, then the MAC header can be correctly decoded with a very high probability.

Accordingly, by using the soft bits, the receiving device can estimate the detection rate of the MAC header. Such estimations may be performed with well-known techniques. For example, such techniques have been applied in the early detection of a MAC header before the whole packet is received. This early detection allows for power saving (e.g., reception of the packet's data portion may be skipped if the packet is not intended for the receiving device).

A packet's MAC header contains useful information, such as the sender's address and the packet's duration. When a receiving device correctly decodes the MAC header of a corrupted packet, the receiving device may use such information to assist the transmitting device in sending a retransmission. This assistance may include reserving the channel for the retransmission. Further, this assistance may include link adaptation suggestions for the transmitting device to consider employing. Such link adaptation suggestions may include (but are not limited to) packet fragmentation, modulation code scheme (MCS), and/or spatial stream information.

Operations for embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. Embodiments are not limited to this context.

Figure 2:
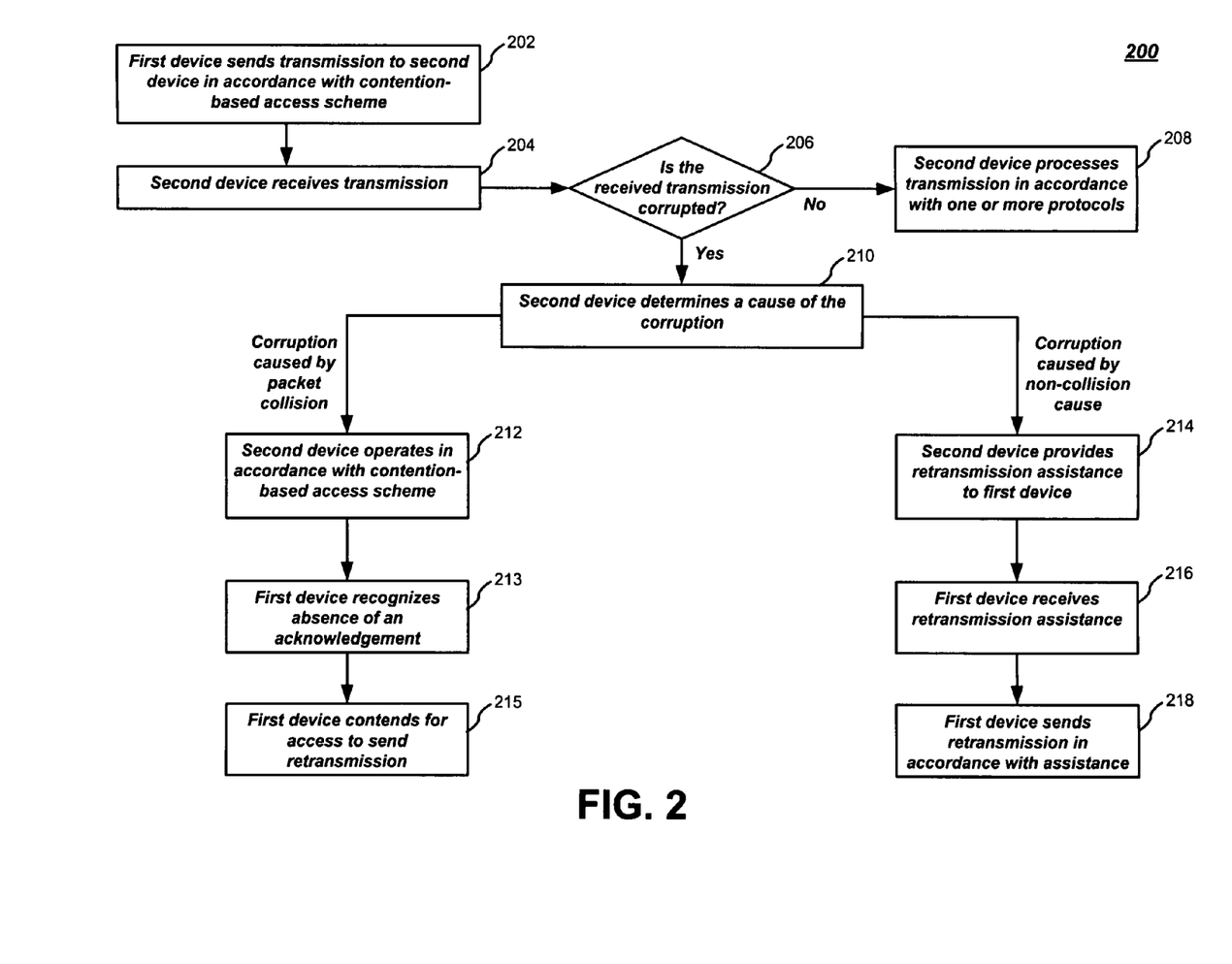
FIGS. 2-4 are flow diagrams of exemplary operational sequences.

FIG. 2 is a diagram of a logic flow 200, which may be representative of the operations executed by one or more embodiments described herein. Although FIG. 2 shows a particular sequence, other sequences may be employed. Also, the depicted operations may be performed in various parallel and/or sequential combinations.

The flow of FIG. 2 is described in the context of a first device and a second device. The first device may be a mobile station (e.g., STA 104a of FIG. 1) and the second device may be an access point (e.g., AP 102 of FIG. 1). These devices may participate in a WLAN (e.g., an IEEE 802.11 network). Embodiments, however, are not limited to WLANs or to the context of FIG. 1.

At a block 202, the first device sends a transmission to the second device. This transmission may be a packet sent in accordance with a contention-based access scheme, such as CSMA. The second device receives this transmission at a block 204.

At a block 206, the second device determines whether the received transmission is corrupted. This may involve performing error detection decoding, a cyclical redundancy check, and/or various other technique(s). Also, this may involve the second device deducing various information from the MAC header of the received transmission. For instance, the second device may determine that it is the addressed recipient of the packet, and that the first device is the sending device of the packet. As described herein, the second device may use this information to schedule retransmission of a corrupted transmission. Thus, unlike conventional WLANs (e.g., IEEE 802.11a/b/g/n systems) embodiments provide for a retransmission to be requested.

As shown in FIG. 2, if the second device concludes that the transmission is uncorrupted, then operation proceeds to a block 208, where the second device processes the transmission in accordance with one or more protocol layers. Further, if the transmission was correctly received, then block 208 may include sending an acknowledgement (ACK) response to the transmitting device.

However, if the second device concludes that the transmission is corrupted, then operation proceeds to a block 210. At block 210, the second device determines a likely cause of the corruption. This may involve the second device processing soft bit values. Exemplary details regarding the determination of block 210 are provided below with reference to FIG. 3.

FIG. 2 shows that if the second device determines an in-network packet collision (a non-hidden node packet collision) caused the corruption, then operation proceeds to a block 212. However, if the second device determines that the corruption did not occur from such a collision cause, then operation proceeds to a block 214.

At block 212, the second device operates in accordance with contention-based access scheme. Thus, for CSMA access, the second device does not send an acknowledgment. Based on this, the first device will (in due course) recognize the absence of an acknowledgment at a block 213.

From this, the first device contends for media access to send a retransmission at a block 215. This contention is in accordance with the employed contention-based access scheme (e.g., CSMA, CSMA/CD, etc.). In the context of conventional WLANs, this may involve waiting until the SIFS times out and contending for the channel from scratch. For example, the first device may first double the size of contention window from 15 to 31 before counting down. The average waiting time is then 15 slots (i.e. 135 microseconds for 802.11a networks).

Alternatively, at block 214, the second device provides retransmission assistance to the first device. This may involve reserving the channel to provide the first device with media access. Further, this may involve providing the first device with one or more link adaptation suggestions. Exemplary details regarding such assistance are described below with reference to FIG. 4.

FIG. 2 shows that the first device receives the assistance at a block 216. In accordance with this assistance, the first device sends a retransmission at a block 218.

Figure 3:
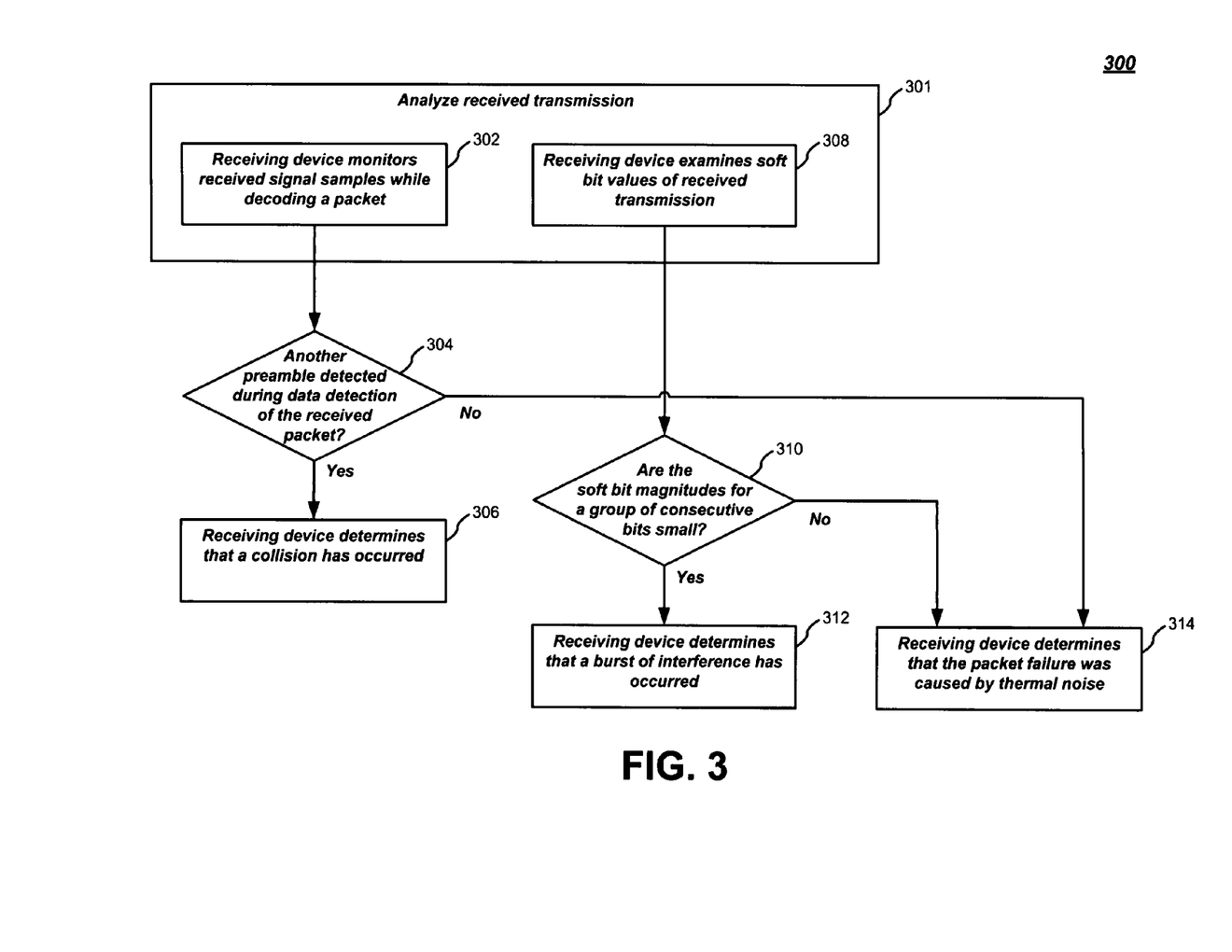

As described above, a receiving device (e.g., the second device of FIG. 2) may determine a cause of a packet corruption. An exemplary logic flow 300 of such a determination is provided in FIG. 3. Although FIG. 3 shows a particular sequence, other sequences may be employed. Also, the depicted operations may be performed in various parallel and/or sequential combinations.

At a block 301, the receiving device analyzes the received transmission. As shown in FIG. 3, this may include blocks 302 and 308. At block 302, the receiving device (e.g., one with multiple receive antennas) monitors received signal samples while detecting a packet. This may be done to detect whether another preamble and/or channel training symbol comes from another device. At block 304, it is determined whether another preamble and/or channel training symbol is detected during the data detection of the received packet. If so, then the receiving device determines at a block 306 that a collision occurs (possibly from a hidden node).

At block 308, the receiving device examines soft bit values of the received transmission. From these values, it is determined (at a block 310) whether the magnitudes of a group of consecutive soft bits are small. If so, then the receiving device determines (at a block 312) that a burst of interference has occurred.

FIG. 3 shows that if neither of a colliding preamble (and/or channel training symbol), nor a burst interference corruption is detected, then the receiving device may determine (at a block 314) that the packet failure was caused by thermal noise.

Figure 4:
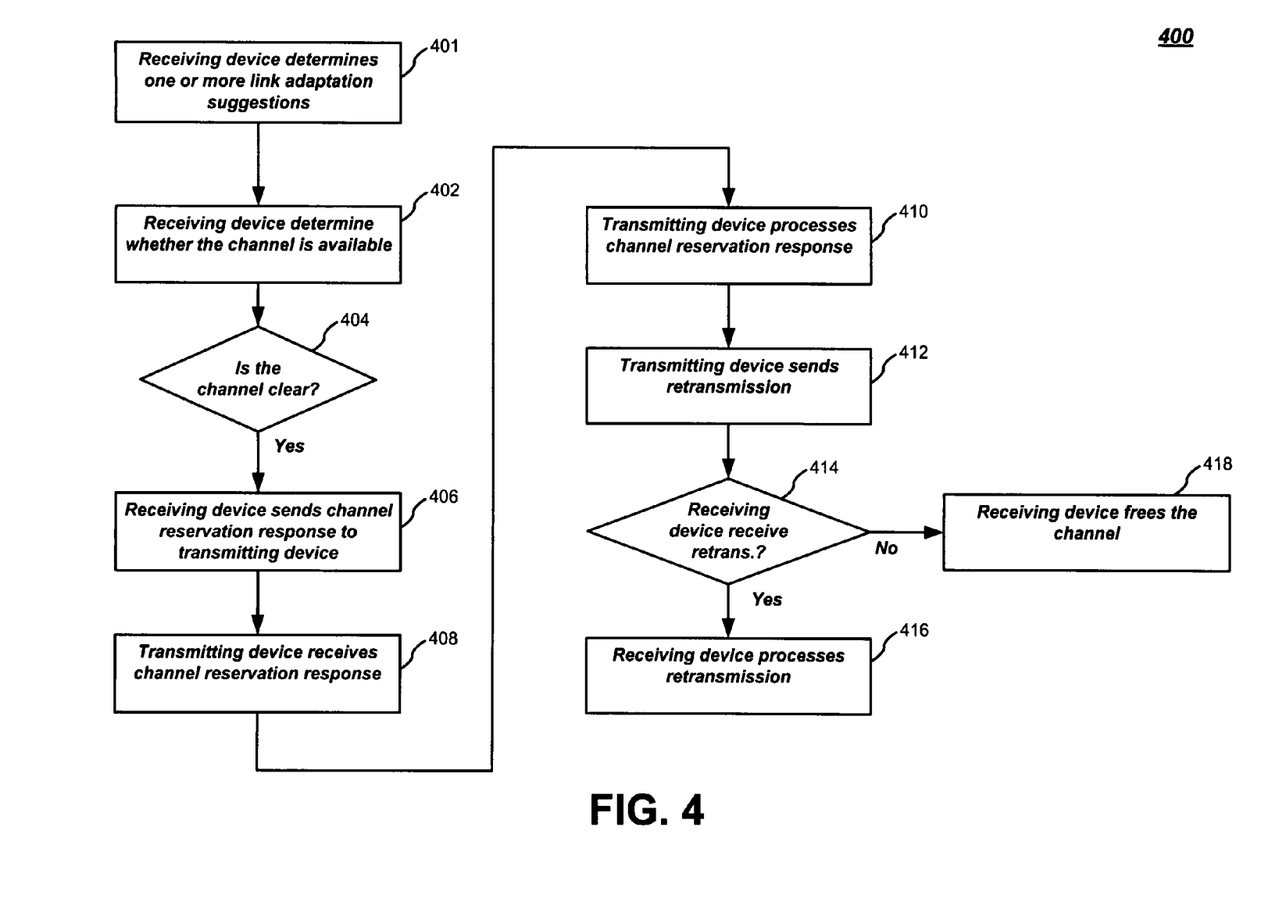

As described above, a receiving device may provide a transmitting device with assistance in sending a retransmission. Such assistance may help remove waiting time that the transmitting device would otherwise experience through conventional contention-based access schemes. FIG. 4 provides an exemplary logic flow 400 of such assistance.

As shown in FIG. 4, the receiving device determines (at a block 401) one or more link adaptation suggestions (if any). In embodiments, various suggestions may be determined. For instance, the receiving device may suggest that the transmitting device fragment the retransmitted packet if the failure is due to bursty interference. Also, if the packet failure is due to thermal noise, then the receiving device may suggest that the transmitting device lower the rate of its modulation/code scheme (MCS). Further, the receiving device may suggest that the transmitting device does not increase its contention window size. Also, the receiving device may suggest that the transmitting device changes the number of spatial streams that it employs with the receiving device. These suggestions are provided for the purposes of illustration, and not limitation. Any combination of these suggestions types may be employed. Moreover, embodiments may employ other types of suggestions.

As described above, embodiments may suggest changing a number of employed spatial streams. For example, a response (such as the packet described below with reference to FIG. 5) may suggest changing the number of spatial streams employed by a transmitting device. Reducing the number of such spatial streams increases the receiver's capability to null out interference. For instance, interference (e.g., interference caused by a platform noise source, such as a bus clock on a personal computer) impinges a receiving device's antenna array from a certain spatial direction for each subcarrier. By using multiple receive antennas, the receiving device can form a null pointing to the interference source's direction to null out the interference. If multiple data streams are sent by the transmitting device, the receiving device may not have enough antennas to null the interference while receiving the multiple data streams.

At a block 402, the receiving device determines whether the transmission channel is available. In embodiments, this may involve performing channel sensing by CS/CCA. A block 404 indicates that if the channel is available, then a block 406 is performed. At block 406, the receiving device reserves the channel for a retransmission. This may involve sending one or more responses to the transmitting device. For example, block 406 may involve the receiving device sending a CTS packet to the transmitting device.

At a block 408, the transmitting device receives the response from the receiving device. After determining that it is the intended recipient, the transmitting device processes the response at a block 410. As described herein, the response may be in the form of a CTS packet. Accordingly, processing at block 410 may involve determining whether an RTS was sent as a prelude to the CTS. If the transmitting device determines that it did not send a request to send (RTS) right before the CTS, then the transmitting device interprets the CTS as a NACK.

Accordingly, at a block 412, the transmitting device retransmits the originally sent packet (as described above with reference to block 216 of FIG. 2). In the context of IEEE 802.11 networks, this may occur after the occurrence of a SIFS time interval.

At a block 414, the receiving device determines whether has received the retransmission. This may involve determining whether a preamble has been detected (e.g., after a SIFS time interval).

If the retransmission has been received, then the receiving device processes the retransmission at a block 416. This may involve performing error detection decoding, a cyclical redundancy check, operations in accordance with one or more protocol layers, and/or various other operations. Further, if the retransmission was correctly received, then block 416 may include sending an acknowledgement (ACK) response to the transmitting device.

However, if the retransmission has not been received, then the receiving device may conclude that the transmitting device is unable to interpret the response sent at block 408. For example, in the context of IEEE 802.11 networks, the transmitting device may be a legacy device that is unable to interpret a CTS response as a NACK. Thus, at a block 418, the receiving device may free the channel. In the context of IEEE 802.11 networks, this may involve sending a CF-End packet if the channel is clear. In embodiments, block 418 may be performed after a predetermined number of responses have been sent.

The foregoing description illustrates that a receiving device may determine information regarding the type of interference that caused a packet failure. From this information, the receiving device may suggest technique(s) to combat such performance-limiting interference. As described above, such techniques may include (but are not limited to) suggesting packet fragmentation settings, contention window settings, spatial stream settings, and/or MCS settings. Also, the receiving device may facilitate a retransmission (e.g., reserve the channel).

The receiving device may send such suggestions and/or channel reservations to the transmitting device in one or more MAC control messages (e.g., at block 406 of FIG. 4). In embodiments, the receiving device may aggregate such help into a single response packet. An example of such a response packet is shown in FIG. 5.

Figure 5:
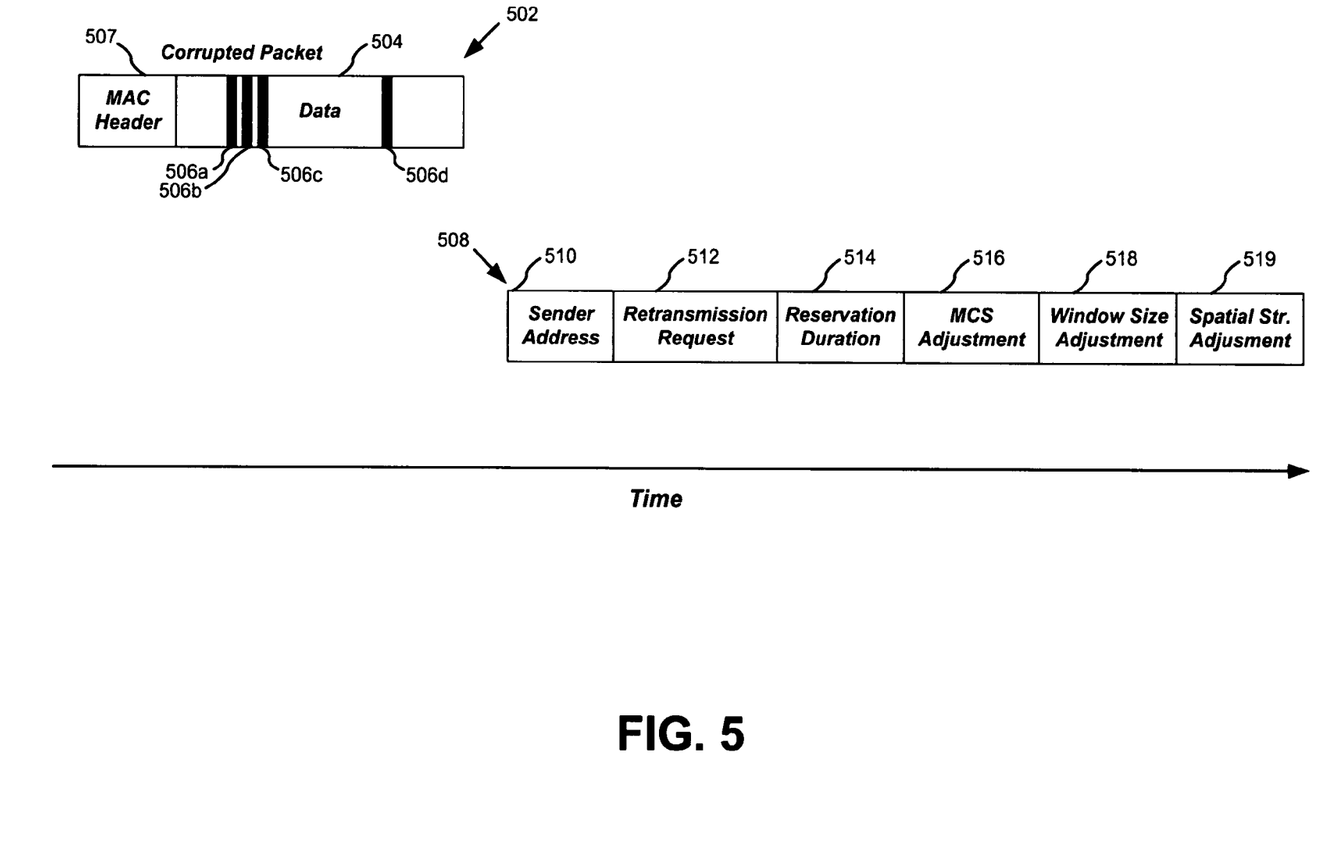
FIG. 5 is a diagram of exemplary packets.

In particular, FIG. 5 shows a corrupted packet 502 that a receiving device (e.g., AP 102) receives from a transmitting device (e.g., STA 104a). Corrupted packet 502 includes a data portion 504 having multiple corrupted bits 506a-d. As a result, data portion 504 can not be received (e.g., properly decoded). Also, FIG. 5 shows that corrupted packet 502 has a MAC header portion 507 that is uncorrupted. This header portion includes information, such as MAC addresses of the transmitting device and the receiving device.

From uncorrupted MAC header portion 507, the receiving device may determine that corrupted packet 502 was intended for it. As a result, the receiving device may generate a response packet 508 and send it to the transmitting device. As described above, response packet 508 may include aggregated information. For example, FIG. 5 shows response packet 508 including a sender address 510, a retransmission request 512, a reservation duration 514, an MCS adjustment indicator 516, a contention window size adjustment indicator 518, and a spatial stream adjustment indicator 519 (to suggest an adjustment to the number of employed spatial streams). Embodiments, however, are not limited to this example. Thus, response packets may include other combinations of information.

The information in response packet 508 may be jointly encoded or indexed. For example, in embodiments, MCS adjustment indicator 516, contention window size adjustment indicator 518, and spatial stream adjustment indicator 519 may each have three values (i.e., increase, decrease, and no change). These two indicators can be jointly indexed by 3 bits instead of 2 bits each. Also, in embodiments, sender address 510 may be empty if the sender's address was not reliably decoded in corrupted packet 502.

As an alternative to the response packet of FIG. 5, embodiments may employ packets that are compatible with existing IEEE 802.11 standards. For example, the receiving device may send a CTS packet to the transmitting device. This CTS packet may include a NAV to protect the channel for a retransmission to be sent (as well as for a subsequent ACK to be sent). The CTS packet reserves the channel for the transmitting device's retransmission by setting the NAV. If the previous reception error is due to a hidden node transmission, then the CTS packet blocks transmissions from the hidden node, thereby protecting the transmitting device's retransmission.

Figure 6:
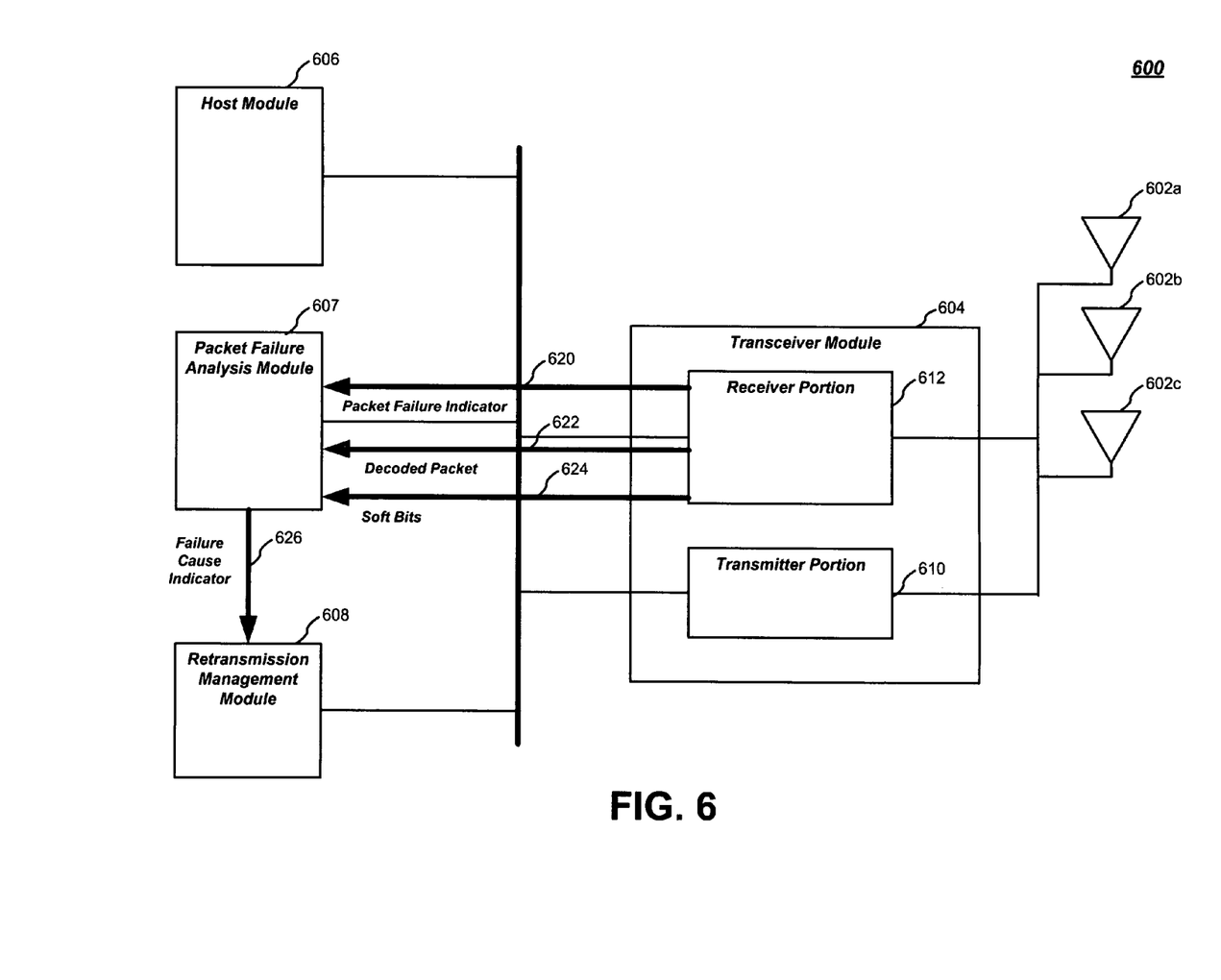
FIG. 6 is a diagram of an exemplary device implementation.

FIG. 6 is a diagram of an exemplary implementation 600 that may employ the techniques described herein. This implementation may be included in a wireless device, such as AP 102, STA 104a and/or STA 104b of FIG. 1. However, this implementation may be also employed in other contexts. Implementation 600 may include various elements. For example, FIG. 6 shows implementation 600 including multiple antennas 602a-c, a transceiver module 604, a host module 606, a packet failure analysis module 607, and a retransmission management module 608. These elements may be implemented in hardware, software, or any combination thereof.

Antennas 602a-c provide for the exchange of wireless signals with remote devices. Although three antennas are depicted, any number of antennas may be employed. Also, embodiments may employ one or more transmit antennas and one or more receive antennas. Such multiple antenna arrangements may be employed for beamforming and/or the employment of multiple spatial streams with a remote device.

As shown in FIG. 6, transceiver module 604 includes a transmitter portion 610, and a receiver portion 612. During operation, transceiver module 604 provides an interface between antennas 602a-c and other elements, such as host module 606, packet failure analysis module 607, and/or retransmission management module 608. For instance, transmitter portion 610 receives symbols from such elements, and generates corresponding signals for wireless transmission by one or more of antennas 602a-c. This may involve operations, such as modulation, amplification, and/or filtering. However, other operations may be employed.

Conversely, receiver portion 612 obtains signals received by one or more of antennas 602a-c and generates corresponding symbols. In turn, these symbols may be provided to elements, such as host module 606, packet failure analysis module 607, and/or retransmission management module 608. This generation of symbols 626 may involve operations, including (but not limited to) demodulation, amplification, and/or filtering.

The signals generated and received by transceiver module 604 may be in various formats. For instance, these signals may be modulated in accordance with an orthogonal frequency division multiplexing (OFDM) scheme. However, other schemes and formats (e.g., QPSK, BPSK, FSK, etc.) may be employed.

To provide such features, transmitter portion 610 and receiver portion 612 may each include various components, such as modulators, demodulators, amplifiers, filters, buffers, upconverters, and/or downconveters. Such components may be implemented in hardware (e.g., electronics), software, or any combination thereof.

The symbols exchanged between transceiver module 604 and other elements may form messages or information associated with one or more protocols, and/or with one or more user applications. Thus, these elements may perform operations corresponding to such protocol(s) and/or user application(s). Exemplary protocols include (but are not limited to) various media access control and discovery protocols. Exemplary user applications include telephony, messaging, e-mail, web browsing, content (e.g., video and audio) distribution/reception, and so forth.

Moreover, in transmitting signals, transceiver module 604 may employ various access techniques. For example, transceiver module 604 may employ a contention-based technique, such as CSMA, CSMA/CA, and so forth. Embodiments, however, are not limited to such techniques.

In embodiments, packet failure analysis module 607 determines a likely cause of for the corruption of a packet received by transceiver module 604. This determination may be in accordance with the techniques described herein. Accordingly, packet failure analysis module 607 may receive various information from receiver portion 612. For example, FIG. 6 shows that this information may include a packet failure indicator 620, a decoded corrupted packet 622, and the packet's corresponding soft symbol values 624.

From this information, packet failure analysis module 607 may determine a likely cause of the packet failure. In embodiments, this determination may be in accordance with the techniques of FIG. 3. Embodiments, however, are not limited to this example.

Upon making this determination, FIG. 6 shows that packet failure analysis module 607 may send a failure cause indicator 626 to retransmission management module 608.

Retransmission management module 608 manages retransmissions operations. For instance, upon receipt of failure cause indicator 626, retransmission management module 608 may perform operations to provide for a retransmission of the failed packet. In addition, retransmission management module 608 may determine one or more suggestions for a remote device, as described herein. Accordingly, in conjunction with transmitter portion 610, retransmission management module 608 may send responses to a remote device, as described herein.

Additionally or alternatively, retransmission management module 608 may also provide features for a device that sends a failed packet. For instance, retransmission management module 608 may handle such reservations and/or suggestions received from a remote device (e.g., through receiver portion 612). In turn, retransmission management module 608 may direct transmitter portion 610 to operate in accordance with the reservations and/or responses.

Host module 506 may exchange symbols with transceiver module 504 that correspond to wireless signals exchanged with remote devices. These symbols may form messages or information associated with one or more protocols, and/or one or more user applications. Thus, host module 506 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The storage medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the techniques described herein are not limited to IEEE 802.11 networks. Thus, these techniques may be employed in other networks, such as ones that employ any combination of directional transmissions, reuse, and/or scheduled media access techniques.

Moreover, the techniques described herein are not limited to the context of communications between a station and an access point. Thus, these techniques may be employed in various peer-to-peer contexts. One may be concerned that in peer-to-peer implementations one response (e.g., NACK-CTS) may collide with another response (e.g., NACK-CTS) and cause a longer delay if the initial packet error is due to a packet collision. However, this can't happen. For instance, if the initially collided packets started at the same time, then the soft bits of both MAC headers have small magnitudes. Therefore, the decoded MAC headers are not used and no NACK-CTS is sent. However, if the initially collided packets started one ahead of the other, then only the early one's MAC header is correctly received and thus only one NACK-CTS is sent.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
receiving, at a receiving device, a packet from a transmitting device associated with the receiving device, the packet having a corruption;
determining, by the receiving device, a cause of the corruption;
wherein the cause of the corruption is an in-network packet collision if a preamble or channel training symbol associated with the packet are not associated with the transmitting device;
wherein the cause of the corruption is a co-channel interference if a Medium Access Control (MAC) header is successfully decoded by analyzing soft bits corresponding to the MAC header of the received packet to confirm that a first consecutive group of the soft bits have first magnitudes that are smaller than second magnitudes associated with a second consecutive group;
when the determined cause of the corruption is the in-network packet collision, allowing, by the receiving device, the transmitting device to send a retransmission of the packet in accordance with a contention-based access scheme; and
when the determined cause of the corruption is the co-channel interference from one or more sources not associated with the receiving device, providing, by the receiving device, retransmission assistance to the transmitting device;
wherein said providing retransmission assistance includes the receiving device reserving a channel for a retransmission of the packet by the transmitting device and/or providing one or more link adaptation suggestions to the transmitting device.

2. The method of claim 1, wherein said providing retransmission assistance includes sending a response to the transmitting device.

3. The method of claim 1, wherein the one or more link adaptation suggestions for the transmitting device includes a modulation coding scheme (MCS) adjustment.

4. The method of claim 1, wherein the one or more link adaptation suggestions for the transmitting device includes a packet fragmentation setting.

5. The method of claim 1, wherein the one or more link adaptation suggestions for the transmitting device includes a contention window adjustment.

6. The method of claim 1, wherein the one or more link adaptation suggestions for the transmitting device includes an adjustment in a number of spatial streams.

7. The method of claim 1, wherein the contention-based access scheme is a carrier sense multiple access (CSMA) scheme.

8. The method of claim 1, wherein determining the cause of the corruption includes analyzing soft bits of the received packet.

9. The method of claim 8, wherein determining the cause of the corruption includes concluding that a burst of interference has occurred when a first consecutive group of the soft bits have first magnitudes that are smaller than second magnitudes associated with a second consecutive group.

10. The method of claim 1, wherein determining the cause of the corruption includes determining whether a preamble was detected during data detection of the received packet.

11. The method of claim 1, wherein determining the cause of the corruption includes determining whether a channel training symbol was detected during data detection of the received packet.

12. A system comprising:
at least one memory that stores computer-executable instructions; and
at least one processor configured to access the at least one memory, wherein the at least one processor is configured to execute the computer-executable instructions to:
receive a packet from a transmitting device in accordance with a contention-based access scheme, the packet having a corruption;
determine a cause of the corruption;
wherein the cause of the corruption is an in-network packet collision if a preamble or channel training symbol associated with the packet are not associated with the transmitting device;
wherein the cause of the corruption is a co-channel interference if a Medium Access Control (MAC) header is successfully decoded by analyzing soft bits corresponding to the MAC header of the received packet to confirm that a first consecutive group of the soft bits have first magnitudes that are smaller than second magnitudes associated with a second consecutive group; and
provide retransmission assistance to the transmitting device when the determined cause of the corruption is the co-channel interference from one or more sources not associated with the transmitting device;

wherein providing said retransmission assistance includes reserving a channel for a retransmission of the packet by the transmitting device, and/or providing one or more link adaptation suggestions for the transmitting device.

13. The system of claim 12, wherein the one or more link adaptation suggestions for the transmitting device includes a modulation coding scheme (MCS) adjustment.

14. The system of claim 12, wherein the one or more link adaptation suggestions for the transmitting device includes a packet fragmentation setting.

15. The system of claim 12, wherein the one or more link adaptation suggestions for the transmitting device includes an adjustment in a number of spatial streams.

16. The system of claim 12, wherein the one or more link adaptation suggestions for the transmitting device includes a contention window adjustment.

17. The system of claim 12, wherein, when the determined cause of the corruption is an in-network packet collision, allowing the transmitting device to send a retransmission of the packet in accordance with the contention-based access scheme.

18. The system of claim 12, wherein the contention-based access scheme is a carrier sense multiple access (CSMA) scheme.

19. A system comprising:
at least one memory that stores computer-executable instructions; and
at least one processor configured to access the at least one memory, wherein the at least one processor is configured to execute the computer-executable instructions to:
send a packet to a transmitting device in accordance with a contention-based access scheme;
receive a response to the packet from the receiving device, wherein the response includes a channel reservation for a retransmission of the packet and one or more link adaptation suggestions, wherein the receiving device determines the packet was corrupted at least in part by co-channel interference from one or more sources not associated with the receiving device;
wherein the co-channel interference is a cause of a corruption if a Medium Access Control (MAC) header is successfully decoded by analyzing soft bits corresponding to the MAC header of the received packet to confirm that a first consecutive group of the soft bits have first magnitudes that are smaller than second magnitudes associated with a second consecutive group; and
send the retransmission of the packet in accordance with the channel reservation and the one or more link adaptation suggestions.

20. The system of claim 19, wherein the one or more link adaptation suggestions includes a modulation coding scheme (MCS) adjustment.

21. The system of claim 19, wherein the one or more link adaptation suggestions includes a packet fragmentation setting.

22. The system of claim 19, wherein the one or more link adaptation suggestions includes a contention window adjustment.

23. The system of claim 19, wherein the contention-based access scheme is a carrier sense multiple access (CSMA) scheme.

* * * * *